(12) United States Patent
Yuasa (10) Patent No.: US 9,556,998 B2
(45) Date of Patent: Jan. 31, 2017

(54) INSULATOR INCLUDING GAS ADSORBENT

(71) Applicant: Panasonic Intellectual Property Management Co., Ltd., Osaka-shi, Osaka (JP)

(72) Inventor: Akiko Yuasa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/783,799

(22) PCT Filed: Apr. 23, 2014

(86) PCT No.: PCT/JP2014/002282
§ 371 (c)(1),
(2) Date: Oct. 9, 2015

(87) PCT Pub. No.: WO2014/174837
PCT Pub. Date: Oct. 30, 2014

(65) Prior Publication Data
US 2016/0069505 A1    Mar. 10, 2016

(30) Foreign Application Priority Data

Apr. 23, 2013  (JP) ................. 2013-089956

(51) Int. Cl.
*B01D 53/02* (2006.01)
*F16L 59/06* (2006.01)
(Continued)

(52) U.S. Cl.
CPC .............. *F16L 59/06* (2013.01); *B01D 53/02* (2013.01); *B01J 20/18* (2013.01); *B01J 20/186* (2013.01);
(Continued)

(58) Field of Classification Search
CPC ................. B01D 2253/108; B01D 2253/1122; B01D 2257/102; B01D 2257/104; B01D 2257/80; B01D 53/02; B01J 20/18; B01J 20/186; B01J 20/28033; B01J 20/28069; F16L 59/06
See application file for complete search history.

(56) References Cited

U.S. PATENT DOCUMENTS 3,925,041 A  *  12/1975  Patterson ........... B01D 53/0423
                                                                          96/133
5,544,490 A      8/1996  Manini et al.
(Continued)

FOREIGN PATENT DOCUMENTS

EP      1 843 076      10/2007
JP      09-512088      12/1997
(Continued)

OTHER PUBLICATIONS

Extended European Search Report for corresponding European application, May 9, 2016, 10 pages.
(Continued)

*Primary Examiner* — Christopher P Jones
(74) *Attorney, Agent, or Firm* — Hamre, Schumann, Mueller & Larson, P.C.

(57) ABSTRACT

Insulators (10A to 10C) according to the present invention include: a core material (11) that retains a space; a sheath material (12) that has a gas bather ability and encloses the core material (11) therein in a decompressed and closed state; and gas adsorbents (20A to 20D) enclosed in the sheath material (12) together with the core material (11). The gas adsorbents (20A to 20D) are each a copper ion-exchanged ZSM-5 type zeolite compact (21) which contains ZSM-5 type zeolite subjected to copper ion exchange, and is molded in such a manner that the density of the zeolite is (Continued)

higher than the density of the core material (11) decompressed and sealed in the sheath material (12).

5 Claims, 5 Drawing Sheets (51) Int. Cl.
*B01J 20/18* (2006.01)
*B01J 20/28* (2006.01)

(52) U.S. Cl.
CPC ..... *B01J 20/28033* (2013.01); *B01J 20/28069* (2013.01); *B01D 2253/108* (2013.01); *B01D 2253/1122* (2013.01); *B01D 2257/102* (2013.01); *B01D 2257/104* (2013.01); *B01D 2257/80* (2013.01)

(56) References Cited

U.S. PATENT DOCUMENTS

| | | | |
|---|---|---|---|
| 5,600,957 | A | 2/1997 | Manini et al. |
| 8,864,885 | B2* | 10/2014 | Yuasa ................ B01J 20/28033 252/194 |
| 2011/0237423 | A1 | 9/2011 | Kikuchi et al. |
| 2011/0237426 | A1 | 9/2011 | Kikuchi et al. |
| 2013/0160652 | A1 | 6/2013 | Yuasa |
| 2013/0291733 | A1* | 11/2013 | Koshiyama ........... F16L 59/065 96/108 |
| 2013/0305928 | A1 | 11/2013 | Kojima et al. |
| 2013/0306655 | A1 | 11/2013 | Takushima et al. |
| 2014/0037119 | A1* | 2/2014 | Yuasa ...................... H04R 1/02 381/346 |
| 2014/0124992 | A1 | 5/2014 | Kikuchi et al. |
| 2016/0136612 | A1* | 5/2016 | Sato ....................... B01J 20/186 428/446 |

FOREIGN PATENT DOCUMENTS

| | | |
|---|---|---|
| JP | 2006-043603 | 2/2006 |
| JP | 2006-043604 | 2/2006 |
| JP | 2006-307995 | 11/2006 |
| JP | 2007-211884 | 8/2007 |
| JP | 2007-239904 | 9/2007 |
| JP | 2008-064135 | 3/2008 |
| JP | 2008-208844 | 9/2008 |
| JP | 2009-281523 | 12/2009 |
| JP | 2011-200789 | 10/2011 |
| JP | 2011-201723 | 10/2011 |
| JP | 2013-053822 | 3/2013 |
| WO | 2012/032786 | 3/2012 |

OTHER PUBLICATIONS

International Search Report of PCT/JP2104/002282 dated Jul. 22, 2014, and English translation thereof, 4 pages total.

* cited by examiner

INSULATOR INCLUDING GAS ADSORBENT

TECHNICAL FIELD

The present invention relates to an insulator including a gas adsorbent, and particularly to a vacuum insulator having a vacuum insulation structure, the insulator including a gas adsorbent that adsorbs the gas in the vacuum insulation structure.

BACKGROUND ART

Recently, in view of importance of preventing warming that is a global environmental problem, energy saving has been desired in various fields, and energy saving has also been promoted for consumer appliances. For example, for freezing refrigerators, an insulator having excellent insulation characteristics is desired in view of efficient utilization of cold heat. One example of the above-mentioned insulator is a vacuum insulator having a vacuum insulation structure.

The vacuum insulator includes a core material that retains a space, and a sheath material that insulates the space and the outside air from each other. The vacuum insulation structure is realized by eliminating the gas in the internal space of the sheath material by evacuation. As the core material, generally a powder material, a fiber material, an open-celled foam, or the like is used.

Here, recently, requirements for vacuum insulators have been diversified, and vacuum insulators with further high performance have been required.

The insulation principle of the vacuum insulator is that air which conduct heat is removed as much as possible to reduce heat conduction by gas. Accordingly, as one method for improving the insulation performance of the vacuum insulator, the internal pressure is made lower to suppress gas heat conduction due to collision of molecules. However, the vacuum degree that can be practically achieved at an industrial level using a vacuum pump is approximately 0.1 Torr (about 13.3 Pa). Therefore, it is substantially difficult to achieve a high vacuum of 0.1 Torr or more even though the internal pressure is to be made lower.

As another method for improving the insulation performance of the vacuum insulator, the gas in the vacuum insulation structure is removed. The inside of the vacuum insulator is in a state of low pressure in substantially vacuum, but some gas may be generated in a small amount from the core material, the inner surface of the sheath material, or the like, or a small amount of air may permeate/penetrate from the outside into the inside of the vacuum insulator with time. Specifically, such gas components include nitrogen, oxygen, moisture, hydrogen and the like, and existence (generation or penetration) of these gas components at the inside is a factor of causing degradation of the insulation performance of the vacuum insulator with time. Thus, when these internal gas components can be adsorbed and removed, the initial insulation performance of the vacuum insulator can be improved, and insulation performance with time can be satisfactorily maintained.

As a gas adsorbent used for this purpose, for example, a vacuum maintaining device using a Ba—Li alloy as disclosed in Patent Literature 1 has been proposed. The vacuum maintaining device has a configuration in which a first pellet formed of a Ba—Li alloy and a second pellet including a drying material are stacked and stored in a container for the purpose of maintaining vacuum in an insulating jacket, and reactivity to a gas such as nitrogen is exhibited even at room temperature.

The applicant of the present application has proposed an insulator using a gas adsorbent formed of copper ion-exchanged ZSM-5 type zeolite as disclosed in Patent Literature 2. The insulator includes at least a core material, a sheath material having a gas barrier ability, and a gas adsorbent, wherein a vacuum insulation structure is realized by decompressing the inside of the sheath material. The gas adsorbent is used for adsorbing air in an internal space of the sheath material to maintain the decompressed state of the internal space.

Copper ion-exchanged ZSM-5 type zeolite has an excellent adsorbing capability for nitrogen and oxygen as air components, or moisture. Accordingly, when the gas adsorbent is one using copper ion-exchanged ZSM-5 type zeolite, air components that cannot be eliminated by a vacuum pump, a gas generated at the inside of the vacuum insulator, and air components, moisture or the like that permeate/penetrate from the outside to the inside with time can be satisfactorily adsorbed and removed. As a result, the vacuum insulator can exhibit excellent insulation performance.

Zeolite is generally in the form of a powder, and a large number of techniques for producing a zeolite structure by molding a raw material containing zeolite have been proposed. Specifically, for example, Patent Literatures 3 and 4 disclose that zeolite particles, an inorganic binding material for binding the zeolite particles, and an organic binder are mixed, and the mixture is extrusion-molded and then fired to obtain a porous zeolite structure.

CITATION LIST

Patent Literature

PTL 1: National Publication of International Patent Application No. 9-512088

PTL 2: Japanese Laid-Open Patent Application Publication No. 2006-43604

PTL 3: Japanese Laid-Open Patent Application Publication No. 2011-201723

PTL 4: Japanese Laid-Open Patent Application Publication No. 2011-200789

SUMMARY OF INVENTION

Technical Problem

However, in a gas adsorbent having a configuration as described above, it is difficult to improve a gas adsorption capacity and handling characteristics while suppressing an increase in heat conductivity of a vacuum insulator.

Specifically, for example, the vacuum maintaining device disclosed in Patent Literature 1 is formed of a Ba—Li alloy pellet and a drying material pellet, and as an example of the drying material, barium oxide (BaO) is shown. The Ba—Li alloy and the drying material each have a high solid heat conductivity, and therefore when they are enclosed in the vacuum insulator and used as a gas adsorbent, the heat conductivity at a location where the vacuum maintaining device exists increases.

On the other hand, the copper ion-exchanged ZSM-5 type zeolite disclosed in Patent Literature 2 is a porous material. Thus, a gas adsorbent using the zeolite has a lower solid heat conductivity as compared to the vacuum maintaining device disclosed in Patent Literature 1. Therefore, the possibility of increasing the heat conductivity at a location where the gas adsorbent exists can be effectively suppressed even when the gas adsorbent is enclosed in the vacuum insulator. However, since copper ion-exchanged ZSM-5 type zeolite is basically in the form of a powder, it may get into the air, or stick to the sheath material when enclosed in the sheath material. Therefore, for using copper ion-exchanged ZSM-5 type zeolite as a gas adsorbent, it is required to further improve handling characteristics.

Here, the zeolite structure disclosed in each of Patent Literatures 3 and 4 is not a gas adsorbent that is applied to the vacuum insulator, but a use for adsorption of an exhaust gas from an automobile etc. is disclosed or suggested. Thus, copper ion-exchanged ZSM-5 type zeolite may be molded by a molding method as disclosed in Patent Literature 3 or 4.

However, in the molding method disclosed in Patent Literature 3 or 4, an inorganic binding material and an organic binder are mixed with zeolite and molded, and the mixture is then fired. In this molding method, a metal ion site in copper ion-exchanged ZSM-5 type zeolite may be oxidized. Since the metal ion site is an adsorption active spot that exhibits a gas adsorbing action under reduced pressure, a zeolite structure in which the site is oxidized may be unable to sufficiently adsorb sparse gas molecules existing in the vacuum insulator.

When an organic binder is used for molding a zeolite structure, there is the possibility that the organic binder is not fully decomposed by firing, and remains as an organic component. When the inside of the sheath material is decompressed, a very small amount of gas may be released from the remaining organic component. Accordingly, when a zeolite structure obtained in the molding method disclosed in Patent Literature 3 or 4 is used as a gas adsorbent, the insulation performance of the vacuum insulator may be deteriorated by a very small amount of gas released.

The present invention has been devised for solving the above-mentioned problems, and an object of the present invention is to provide an insulator having a vacuum insulation structure, the insulator including a gas adsorbent capable of improving a gas adsorption capacity and handling characteristics while suppressing an increase in heat conductivity.

Solution to Problem

For solving the problems described above, an insulator according to the present invention includes: a core material that retains a space; a sheath material that has a gas barrier ability and encloses the core material therein in a decompressed and closed state; and a gas adsorbent enclosed in the sheath material together with the core material, wherein the gas adsorbent is a copper ion-exchanged ZSM-5 type zeolite compact which contains ZSM-5 type zeolite subjected to copper ion exchange and which is molded in such a manner that the density of the zeolite is higher than the density of the core material decompressed and sealed in the sheath material.

In the configuration described above, the internal pressure of the insulator can be effectively reduced, so that initial insulation performance can be improved, and an increase in internal pressure with time can be effectively suppressed, so that insulation characteristics with time can be maintained. The possibility of partially increasing the heat conductivity at a location where the gas adsorbent exists can be effectively suppressed even when the gas adsorbent is enclosed in the insulator. As a result, partial deterioration of the insulation performance of the insulator, which is caused by the gas adsorbent, can be effectively avoided. Moreover, since the gas adsorbent can be enclosed in the insulator in a stable state, excellent handling characteristics as a gas adsorbent can be achieved, and the possibility of impairing the external appearance of the insulator can be avoided.

The above and other objects, features and advantages of the present invention will become apparent from the following detailed description of the preferred embodiments when taken in conjunction with the accompanying drawings.

Advantageous Effect of Invention

Owing to the above configuration, the present invention exhibits the advantageous effect of being able to provide an insulator having a vacuum insulation structure, the insulator including a gas adsorbent capable of improving a gas adsorption capacity and handling characteristics while suppressing an increase in heat conductivity.

DESCRIPTION OF EMBODIMENTS

An insulator according to the present invention includes: a core material that retains a space; a sheath material that has a gas bather ability and encloses the core material therein in a decompressed and closed state; and a gas adsorbent enclosed in the sheath material together with the core material, wherein the gas adsorbent is a copper ion-exchanged ZSM-5 type zeolite compact which contains ZSM-5 type zeolite subjected to copper ion exchange and which is molded in such a manner that the density of the zeolite is higher than the density of the core material decompressed and sealed in the sheath material.

In the configuration described above, the gas adsorbent contains ZSM-5 type zeolite subjected to copper ion exchange (copper ion-exchanged ZSM-5 type zeolite), the gas adsorption capacity of which is relatively high. Accordingly, a very small amount of gases existing in the insulator (e.g. air components that cannot be eliminated by a vacuum pump etc., a small amount of gas generated at the inside, and a small amount of air components, moisture or the like that permeate/penetrate from the outside to the inside with time) can be satisfactorily adsorbed and removed. Accordingly, the internal pressure of the insulator can be effectively reduced, so that initial insulation performance can be improved, and an increase in internal pressure with time can be effectively suppressed, so that insulation characteristics with time can be maintained.

In the configuration described above, the gas adsorbent is molded in such a manner that the density of copper ion-exchanged ZSM-5 type zeolite is higher than the density of the core material. Copper ion-exchanged ZSM-5 type zeolite is an inorganic porous material with the ratio of the gas phase being relatively high, and therefore has a relatively low solid heat conductivity even when molded with a high density. Accordingly, the possibility of partially increasing the heat conductivity at a location where the gas adsorbent exists can be effectively suppressed even when the gas adsorbent is enclosed in the insulator. As a result, partial deterioration of the insulation performance of the insulator, which is caused by the gas adsorbent, can be effectively avoided.

Moreover, since the gas adsorbent is a copper ion-exchanged ZSM-5 type zeolite compact, handling characteristics are improved. The gas adsorbent can be effectively inhibited from getting into the air like powdered copper ion-exchanged ZSM-5 type zeolite, or sticking to the sheath material when enclosed in the sheath material. Accordingly, in production of the insulator, a predetermined amount of the gas adsorbent can be enclosed in the sheath material without causing a loss of a part of the gas adsorbent. Since the gas adsorbent is not in the form of a powder, but is a compact, and therefore can be enclosed in a stable state in the insulator. As a result, excellent handling characteristics as a gas adsorbent can be achieved, and the possibility of impairing the external appearance of the insulator can be avoided.

The insulator having the configuration described above may have a configuration in which the molding density of the ZSM-5 type zeolite in the gas adsorbent, which is subjected to copper ion exchange, is in a range of 0.9 to 1.4 g/cm$^3$.

In the configuration described above, when the molding density of copper ion-exchanged ZSM-5 type zeolite is in the above-mentioned range, the porosity of the gas adsorbent is in a range of about 40 to 60% by volume. When the porosity is in the above-mentioned range, air contained in voids of the gas adsorbent can be relatively easily removed even by evacuating the inside of the sheath material using a vacuum pump etc. during production of the insulator. As a result, partial deterioration of the insulation performance of the insulator, which is caused by the gas adsorbent, can be effectively avoided. When the molding density is in the above-mentioned range, a compact having a high density and excellent shape stability is obtained, so that handling characteristics as a gas adsorbent can be further improved.

The insulator having the configuration described above may have a configuration in which the nitrogen adsorption capacity of the gas adsorbent is 10 cm$^3$/g or more at normal temperature and normal pressure.

In the configuration described above, when the lower limit of the nitrogen adsorption capacity of the gas adsorbent is the above-mentioned value, nitrogen, i.e. the most major component in air can be particularly satisfactorily adsorbed. Therefore, air components that cannot be eliminated by a vacuum pump etc., a small amount of air components that permeate/penetrate from the outside to the inside with time, or the like can be further satisfactorily adsorbed and removed. Accordingly, an insulator having further satisfactory insulation performance can be obtained.

The insulator having the configuration described above may have a configuration in which the insulator includes as the gas adsorbent a sub-gas adsorbent that is used in combination with the copper ion-exchanged ZSM-5 type zeolite compact, and the sub-gas adsorbent does not contain the copper ion-exchanged ZSM-5 type zeolite and is capable of adsorbing at least one of moisture and oxygen.

In the configuration described above, copper ion-exchanged ZSM-5 type zeolite excellent in capability of adsorbing nitrogen is used in combination with a sub-gas adsorbent excellent in capability of adsorbing moisture or oxygen or both. Copper ion-exchanged ZSM-5 type zeolite has an excellent adsorbing capability for nitrogen and oxygen as main air components, moisture or the like, and can particularly satisfactorily adsorb nitrogen for which general gas adsorbents do not have a sufficient adsorption capability. On the other hand, even general gas adsorbents have a satisfactory adsorption capability for oxygen or moisture. Copper ion-exchanged ZSM-5 type zeolite is relatively expensive, and when an adsorbent which is more inexpensive than the zeolite is selected and used as a sub-gas adsorbent, production costs of the insulator can be reduced.

In the configuration described above, among nitrogen, oxygen and moisture that likely exist in the insulator, particularly nitrogen can be adsorbed and removed by the copper ion-exchanged ZSM-5 type zeolite compact, and oxygen or moisture (or both) can be adsorbed and removed by the sub-gas adsorbent. Further, oxygen or moisture can be adsorbed and removed by not only the sub-gas adsorbent but also the copper ion-exchanged ZSM-5 type zeolite compact. Accordingly, the internal pressure of the insulator can be further effectively reduced, so that an insulator having further satisfactory insulation performance can be obtained.

The insulator having the configuration described above may have a configuration in which in the gas adsorbent, the surface of at least a part of the copper ion-exchanged ZSM-5 type zeolite compact is covered with the sub-gas adsorbent.

In the configuration described above, among gases to be adsorbed and removed, oxygen or moisture can be preferentially adsorbed and removed by the sub-gas adsorbent made to cover the surface, and nitrogen (and oxygen and hydrogen that cannot be removed) can be adsorbed and removed by copper ion-exchanged ZSM-5 type zeolite. Accordingly, the role of adsorption and removal by a plurality of types of gas adsorbents can be satisfactorily shared. As a result, the internal pressure of the insulator can be further effectively reduced, so that an insulator having further satisfactory insulation performance can be obtained.

Preferred embodiments of the present invention will be described below with reference to the drawings. Hereinafter, the same reference symbol is assigned to the same or corresponding element through all the drawings, and the duplicated description thereof is not given.

(Embodiment 1)

[Configuration of Insulator]

Figure 1:
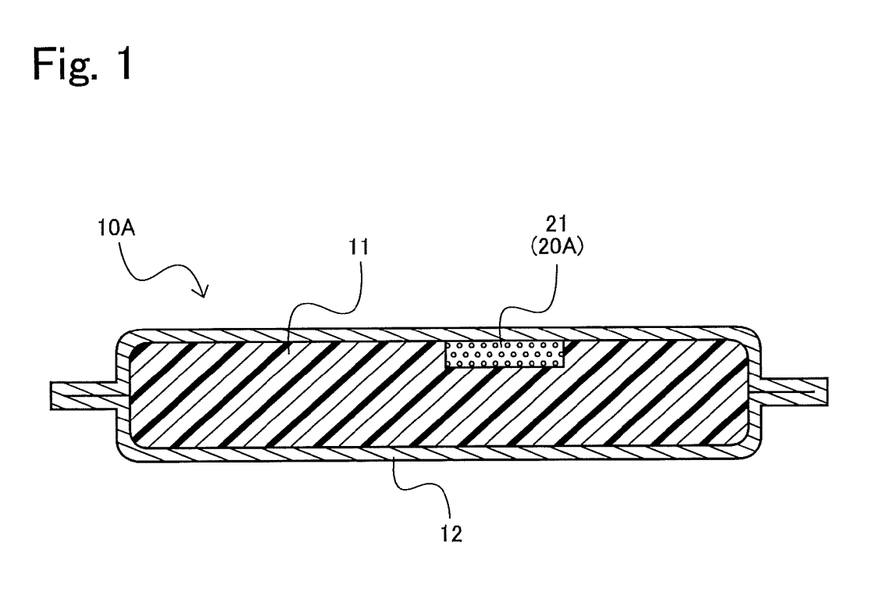
FIG. 1 is a schematic sectional view showing an outlined configuration of an insulator according to embodiment 1 of the present invention.

In embodiment 1, one example of the specific configuration of an insulator according to the present invention will be described with reference to FIG. 1. As shown in FIG. 1, an insulator 10A according to embodiment 1 includes a core material 11, a sheath material (outer skin material) 12, and a copper ion-exchanged ZSM-5 type zeolite compact 21 as a gas adsorbent 20A. The inside of the sheath material 12 is constituted by a vacuum insulation structure in which the core material 11 is enclosed in a decompressed state.

The core material 11 retains the internal space of the vacuum insulation structure, and preferably has insulation characteristics. The specific configuration of the core material 11 is not particularly limited, and a material known in the field of the insulator 10A can be suitably used. Specific examples include open-celled foams of polymer materials such as polystyrene and polyurethane, open-celled foams of inorganic materials, powders of inorganic materials, powders of organic materials, inorganic fiber materials and organic fiber materials. Only one of these materials may be used in the core material 11, or two or more of these materials may be appropriately combined and used as the core material 11. When the material used as the core material 11 is a powder or fiber material, the material may be molded in conformity to the shape of the insulator 10A using a known method.

The sheath material 12 has a gas barrier ability, and encloses the core material 11 therein in a decompressed and closed (sealed) state. The specific configuration of the sheath material 12 is not particularly limited, and a known material can be suitably used as long as it is capable of hindering penetration of a gas to the inside (has a gas barrier ability), and is applicable to the insulator 10A. Specific examples may include containers formed of one material, such as metallic containers and glass containers; and containers formed of a composite material such as a laminate of a resin material and a metal material, and a laminate film composed of a surface protecting layer, a gas barrier layer and a heat-welding layer.

Here, the gas barrier ability in the present invention means that generally the gas permeability only needs to be $10^4$ [$cm^3/m^2 \cdot day \cdot atm$] or less, preferably $10^3$[$cm^3/m^2 \cdot day \cdot atm$] or less, more preferably $10^2$[$cm^3/m^2 \cdot day \cdot atm$] or less.

The gas adsorbent 20A is enclosed in the sheath material 12 together with the core material 11, and adsorbs and removes gas components remaining in the sheath material 12, i.e. the vacuum insulation structure, or gas components penetrating from the outside with time. It is only necessary that the gas adsorbent 20A to be used in the present invention contains at least ZSM-5 type zeolite subjected to copper ion exchange (copper ion-exchanged ZSM-5 type zeolite), and is molded in such a manner that the density of the zeolite is higher than the density of the core material 11 decompressed and sealed in the sheath material 12. In this embodiment, as the gas adsorbent 20A, the copper ion-exchanged ZSM-5 type zeolite compact 21 is used as described above.

The specific configuration of the copper ion-exchanged ZSM-5 type zeolite compact 21 will be described later. The insulator 10A according to this embodiment is not limited to the configuration including the core material 11, the sheath material 12 and the gas adsorbent 20A, and may have a configuration other than the above-mentioned configuration.

Here, the method for measurement of density is not particularly limited, and a known method can be used, but in this embodiment, both the density of the copper ion-exchanged ZSM-5 type zeolite compact 21 and the density of the core material 11 are measured by the following method.

First, for the copper ion-exchanged ZSM-5 type zeolite compact 21 or the core material 11, a sample for measurement of density is provided, and the weight of the sample is measured. Next, the size of the sample is measured, and the volume of the compact is calculated from the measured size. The density of the copper ion-exchanged ZSM-5 type zeolite compact 21 or the core material 11 is calculated from the calculated volume and the measured weight.

Next, one example of a method for producing the insulator 10A according to this embodiment will be described in detail. In this embodiment, for example, a compact of glass wool which is an inorganic fiber material is employed as the core material 11, and the above-mentioned laminate film (composed of a surface protecting layer, a gas bather layer and a heat-welding layer) is employed as the material of the sheath material 12.

First, rectangular (tetragonal) laminate films are provided, the two laminate films are superimposed on each other, heat-welded at three sides, and left as an opening at the remaining one side. The compact of glass wool as the core material 11 and the copper ion-exchanged ZSM-5 type zeolite compact 21 as the gas adsorbent 20A are inserted from the opening into the bag-shaped sheath material 12 formed as described above. At this time, the copper ion-exchanged ZSM-5 type zeolite compact 21 is disposed on the upper surface of the core material 11 in a superimposed manner.

Thereafter, the sheath material 12 with the core material 11 and the gas adsorbent 20A inserted therein is placed in a chamber connected to, for example, a vacuum pump. The vacuum pump is operated to decompress the inside of the chamber. When the pressure in the chamber reaches, for example, about 10 Pa, the opening of the sheath material 12 is sealed by heat welding. Accordingly, the heat-welding layers of the laminate films are welded to each other, and therefore the inside of the sheath material 12 is sealed in a decompressed state to form a vacuum insulation structure. As a result, the insulator 10A according to this embodiment is produced.

Here, since the gas adsorbent 20A contains, as a main component, copper ion-exchanged ZSM-5 type zeolite having a gas adsorbing activity, the zeolite may adsorb ambient air in the process for production of the insulator 10A. If the gas adsorbent 20A (copper ion-exchanged ZSM-5 type zeolite compact 21) adsorbs ambient air, it may be unable to sufficiently adsorb and remove the gas in the vacuum insulation structure because much of the gas adsorption capacity of the gas adsorbent 20A is consumed. Therefore, when the gas adsorbent 20A is inserted into the sheath material 12 in an air-exposed state, it is desirable to make the air exposure time as short as possible.

Alternatively, the gas adsorbent 20A may be inserted into the sheath material 12 while being filled in a known closed (sealed) container. Specifically, for example, a closed container is filled with the gas adsorbent 20A, and then placed on the upper surface of the core material 11, the inside is decompressed to seal the opening, and an external force is then applied from the outside of the sheath material 12 to unseal the closed container. Accordingly, the gas adsorbent 20A is stored in the sheath material 12 with the gas adsorption capacity being consumed as little as possible. In this insulator 10A, the gas adsorbent 20A (copper ion-exchanged ZSM-5 type zeolite compact 21) exists in an unsealed container in the vacuum insulation structure.

[Configuration of Gas Adsorbent]

Figure 2:
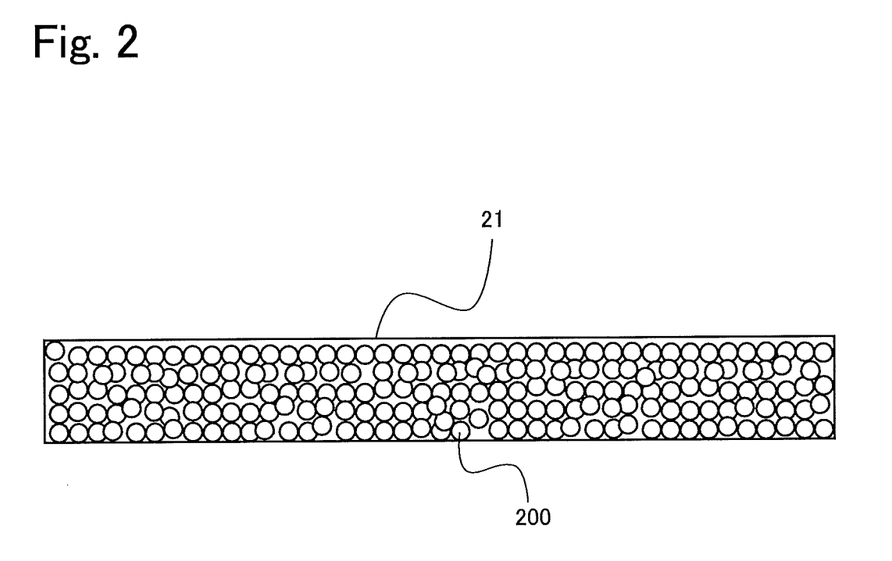
FIG. 2 is a schematic sectional view showing an outlined configuration of a copper ion-exchanged ZSM-5 type zeolite compact that is used in a gas adsorbent provided in the insulator shown in FIG. 1.

Next, one example of the specific configuration of the copper ion-exchanged ZSM-5 type zeolite compact 21 to be used as the gas adsorbent 20A will be described in detail with reference to FIG. 2. As shown in FIG. 2, the copper ion-exchanged ZSM-5 type zeolite compact 21 is formed by molding a copper ion-exchanged ZSM-5 type zeolite powder 200 by a known molding method, and the density of copper ion-exchanged ZSM-5 type zeolite is higher than the density of the core material 11.

The specific configuration of the copper ion-exchanged ZSM-5 type zeolite powder 200 is not particularly limited, and it is only necessary that the powder has a general particle size, and can be molded. The general particle size of the copper ion-exchanged ZSM-5 type zeolite powder 200 is in a range of several μm to several tens μm, but may fall out of this range.

The method for molding the copper ion-exchanged ZSM-5 type zeolite powder 200 into the copper ion-exchanged ZSM-5 type zeolite compact 21 is not particularly limited, and various known molding methods can be suitably used. Specific examples may include, but are not particularly limited to, pressure molding, injection molding, extrusion molding, cast molding, tape molding and granulation forming. Among these molding methods, methods capable of performing molding without using a binder component, and more specific examples may include pressure molding (compression molding). Pressure molding is a method in which a powder as a raw material is filled in a mold, and pressed to obtain a pressure powder compact, and molding can be performed without using a binder component.

The specific shape of the copper ion-exchanged ZSM-5 type zeolite compact 21 is also not particularly limited, and it is only necessary that such handling characteristics can be realized that the copper ion-exchanged ZSM-5 type zeolite compact 21 can be easily enclosed in the sheath material 12. Examples may include shapes such as a disc shape, a rectangular plate shape and a tablet shape.

Further, the copper ion-exchanged ZSM-5 type zeolite compact 21 shown in FIG. 2 is molded using only the copper ion-exchanged ZSM-5 type zeolite powder 200, but the present invention is not limited thereto, and molding may be performed using a known binder component. The specific type of the binder component is not particularly limited, and a known organic material or inorganic material can be suitably used, but at any rate, one that does not hinder the gas adsorbing activity of copper ion-exchanged ZSM-5 type zeolite is desirable.

The added amount (blended amount) of the binder component to the copper ion-exchanged ZSM-5 type zeolite powder 200 is also not particularly limited, and it is only necessary that the binder component is added in an amount in a range which is known to ensure that the copper ion-exchanged ZSM-5 type zeolite compact 21 can be molded. However, when the added amount of the binder component is excessively large, the gas adsorption capacity per unit weight decreases, and therefore it is desirable to minimize the added amount of the binder component. Therefore, in the present invention, the copper ion-exchanged ZSM-5 type zeolite compact 21 is required to have a configuration in which the density of copper ion-exchanged ZSM-5 type zeolite is higher than the density of the core material 11 decompressed and sealed in the sheath material 12.

The copper ion-exchanged ZSM-5 type zeolite compact 21 can also be produced by molding the copper ion-exchanged ZSM-5 type zeolite powder with a binder component added thereto, and then performing firing. However, when the copper ion-exchanged ZSM-5 type zeolite powder 200 is molded, and then fired, the metal ion site of copper ion-exchanged ZSM-5 type zeolite may be oxidized. Since the metal ion site is an adsorption active spot that has a gas adsorbing action under reduced pressure, it may be unable to adsorb sparse gas molecules existing in the insulator 10A if the metal ion site is oxidized. Therefore, when firing is performed during molding, it is necessary to adjust conditions such as the type of a binder component added and the added amount of the binder component.

When an organic material (organic binder) is used as the binder component, an organic component (the organic binder itself, or a component generated by decomposition of the organic binder) may remain in the resulting copper ion-exchanged ZSM-5 type zeolite compact 21 even after firing. Therefore, a very small amount of an organic gas may be released from the remaining organic component at the time when the core material 11 and the gas adsorbent 20A (copper ion-exchanged ZSM-5 type zeolite compact 21) are stored in the sheath material 12 and decompression is performed. Accordingly, the insulation performance of the insulator 10A may be deteriorated, and therefore in the present invention, it is desirable to produce the copper ion-exchanged ZSM-5 type zeolite compact 21 without using a binder component wherever possible.

The molding density of copper ion-exchanged ZSM-5 type zeolite in the copper ion-exchanged ZSM-5 type zeolite compact 21 is not particularly limited, and it is only necessary that the molding density of copper ion-exchanged ZSM-5 type zeolite is higher than the density of the core material 11 (decompressed and sealed in the sheath material 12) as described above, but for example, the molding density of copper ion-exchanged ZSM-5 type zeolite is preferably in a range of 0.9 to 1.4 g/cm$^3$. When the molding density of copper ion-exchanged ZSM-5 type zeolite is in the above-mentioned range, gas components such as air contained in voids of the copper ion-exchanged ZSM-5 type zeolite compact 21 can be relatively easily removed even when the inside of the sheath material 12 is evacuated by a vacuum pump etc. during production of the insulator 10A. As a result, partial deterioration of the insulation performance of the insulator 10A, which is caused by the copper ion-exchanged ZSM-5 type zeolite compact 21, can be effectively avoided. When the molding density is in the above-mentioned range, a compact having a high density and excellent shape stability is obtained, so that handling characteristics as the copper ion-exchanged ZSM-5 type zeolite compact 21 can be further improved.

The gas adsorption capacity of the copper ion-exchanged ZSM-5 type zeolite compact 21 is not particularly limited, but particularly, the nitrogen adsorption capacity is preferably 10 cm$^3$/g (10 ml/g) or more at normal temperature and normal pressure, and preferably 2 cm$^3$/g (2 ml/g) or more at normal temperature and an equilibrium pressure of 10 Pa.

When the lower limit of the nitrogen adsorption capacity of the copper ion-exchanged ZSM-5 type zeolite compact 21 is the above-mentioned value, nitrogen, i.e. the most major component in air can be particularly satisfactorily adsorbed. Therefore, even when air components that cannot be eliminated by a vacuum pump etc. during production of the insulator 10A remain in the vacuum insulation structure, or a small amount of air components permeate/penetrate from the outside into the vacuum insulation structure with time, such air components can be further satisfactorily adsorbed and removed. Accordingly, the initial insulation performance of the insulator 10A is improved, and insulation performance with time can be satisfactorily maintained.

The gas phase ratio in the copper ion-exchanged ZSM-5 type zeolite compact 21 is not particularly limited, and in this embodiment, the gas phase ratio only needs to be in a range of 20 to 60% by volume, and is preferably in a range of 40 to 60% by volume. In this specification, the gas phase ratio refers to a ratio of the gas phase volume to the total volume of the copper ion-exchanged ZSM-5 type zeolite compact 21 where in the copper ion-exchanged ZSM-5 type zeolite compact 21, the zeolite skeleton constitutes the "solid phase", and the volume of pores contained in zeolite and the volume of spaces formed between zeolite powders constitute the "gas phase".

In this embodiment, the solid phase real density of copper ion-exchanged ZSM-5 type zeolite is judged to be in a range of 1.85 to 2.2 g/cm$^3$ with variations taken into consideration. When the solid phase real density is in this range, the gas phase ratio is equivalent to approximately 20 to 60% by volume when the preferred molding density of copper ion-exchanged ZSM-5 type zeolite is in the above-mentioned range of 0.9 to 1.4 g/cm³. Therefore, the gas phase ratio in the copper ion-exchanged ZSM-5 type zeolite compact 21 is preferably in this range.

The zeolite skeleton of copper ion-exchanged ZSM-5 type zeolite is a porous material having pores of angstrom (Å) order, and the copper ion-exchanged ZSM-5 type zeolite compact 21 obtained by molding the zeolite is a compact with spaces formed between zeolite particles (copper ion-exchanged ZSM-5 type zeolite powders 200). On the other hand, for example, conventional alloy-based gas adsorbents (Ba—Li alloys etc.; see Patent Literature 1) do not have pores. Since metal materials have ductility, spaces are hard to be formed between particles due to ductility when an alloy-based gas adsorbent is molded. Since metal materials have ductility, spaces are hard to be formed between particles due to ductility when an alloy-based gas adsorbent is compression-molded as one example.

Therefore, an alloy-based gas adsorbent has a higher heat conductivity as compared to the copper ion-exchanged ZSM-5 type zeolite compact 21 according to the present invention. Accordingly, when an alloy-based gas adsorbent is applied to the insulator 10A, the heat conductivity at a location where the gas adsorbent exists partially increases, so that the insulation performance of the insulator 10A itself is deteriorated.

[Example of Preparation of Copper Ion-Exchanged ZSM-5 Type Zeolite]

Next, one example of the configuration of copper ion-exchanged ZSM-5 type zeolite to be used in the copper ion-exchanged ZSM-5 type zeolite compact 21 will be described in detail.

In this embodiment, copper ion-exchanged ZSM-5 type zeolite can be prepared by passing a process in which zeolite having a ZSM-5 skeleton (ZSM-5 type zeolite) is subjected to copper ion exchange (copper ion exchange step), then washed with water (water-washing step), and subsequently dried (drying step). Steps other than copper ion exchange, water-washing and drying may be performed as necessary.

The specific configuration of ZSM-5 type zeolite used is not particularly limited, and commercially available powdered zeolite can be suitably used. The particle size of ZSM-5 type zeolite is not particularly limited, and only needs to be in a range (several μm to several tens μm as described above) which ensures that the copper ion-exchanged ZSM-5 type zeolite powder 200 can be molded into the copper ion-exchanged ZSM-5 type zeolite compact 21 by a molding method such as pressure molding as described above.

The copper ion exchange step can be performed by a known method. Specifically, for example, a method is generally used in which ZSM-5 type zeolite is immersed in an aqueous solution of a soluble salt of copper. Examples of the soluble salt of copper which is used at this time include inorganic salts such as copper chloride, copper nitrate and copper sulfate, and organic salts such as copper acetate and copper propionate. One subjected to ion exchange in an aqueous solution containing a carboxylic acid salt (carboxylate) of a divalent copper ion ($Cu^{2+}$), such as copper propionate (II) or copper acetate (11), among the soluble salts listed above is preferable because the gas adsorbing activity tends to be improved.

The water-washing step is a step of sufficiently washing ZSM-5 type zeolite with water after the copper ion exchange step. The specific conditions for water-washing are not particularly limited, and it is only necessary that high-purity water such as, for example, ion-exchanged water is used, and the water-washing time is set to a time which ensures that a soluble salt etc. can be sufficiently removed.

The drying step is a step of removing moisture sticking to the surface of ZSM-5 type zeolite after the water-washing step. The specific method for drying is not particularly limited, and it is only necessary that a general heating-drying or vacuum-drying method is used, and the drying temperature and the drying time are set to a temperature and a time which ensure that moisture can be sufficiently removed. The specific conditions for the heating step are not particularly limited, but typically, by performing heating at a temperature generally in a range of 100° C. to 300° C. for, for example, several hours using a known drying furnace etc., about 90 to 95% of moisture absorbed during storage can be dried and removed.

Copper ion-exchanged ZSM-5 type zeolite prepared in this manner can exhibit an excellent gas adsorbing activity in a low-partial pressure region. Specifically, it is known that in zeolite, the diameter of the pore can be controlled by selecting a type of ions. Since copper ion-exchanged ZSM-5 type zeolite has a ZSM-5 skeleton, and contains copper ions, pores formed on the surface of the zeolite have a diameter and a shape which are suitable for adsorption of gas molecules. In addition, introduced copper ions are activated by a heating treatment after passing through the copper ion exchange step, the water-washing step and the drying step as described above. Accordingly, copper ion-exchanged ZSM-5 type zeolite has pores suitable for physical adsorption, and can exhibit satisfactory chemical adsorption owing to activated copper ions, and exhibit an excellent gas adsorbing activity particularly in a low-partial pressure region due to a behavior like chemical adsorption.

The prepared copper ion-exchanged ZSM-5 type zeolite can be used directly for molding of the copper ion-exchanged ZSM-5 type zeolite compact 21, but may be subjected to a variety of post-treatments or post-processing as necessary. Specifically, for example, a vacuum heat treatment, granulation processing or the like may be mentioned.

The vacuum heat treatment can be performed for desorbing moisture in copper ion-exchanged ZSM-5 type zeolite, and activating introduced copper ions. The activation of copper ions by the vacuum heat treatment means that a higher moisture adsorbing activity is exhibited by reducing divalent copper ions ($Cu^{2+}$) to monovalent copper ions ($Cu^+$). Therefore, it is preferable to perform the vacuum heat treatment for further improving the gas adsorbing activity of the resulting copper ion-exchanged ZSM-5 type zeolite compact 21.

The conditions for the vacuum heat treatment of copper ion-exchanged ZSM-5 type zeolite are not particularly limited, but typically, conditions of a pressure of 10 mPa or less, preferably 1 mPa or less, and a heating temperature of 300° C. or higher, preferably 500 to 600° C. may be mentioned. The temperature should be set to 300° C. or higher in principle for causing reduction of copper ions to adequately progress, but the temperature may be 300° C. or lower depending on conditions.

The prepared copper ion-exchanged ZSM-5 type zeolite has a particle size generally in a range of several μm to several tens μm, and therefore can be used directly as the copper ion-exchanged ZSM-5 type zeolite powder 200. Further, even when the particle size is in the above-mentioned range, granulation processing may be performed. The specific method for granulation processing is not particularly limited, and it is only necessary that using a known method, powdered copper ion-exchanged ZSM-5 type zeolite is aggregated and processed into grains.

The time at which molding of the copper ion-exchanged ZSM-5 type zeolite compact 21 (molding step) is performed is not particularly limited, and the molding may be performed after the drying step, or may be performed after the vacuum heat treatment step. Here, when the molding step is performed after the vacuum heat treatment step, it is preferable to perform molding under such conditions that the gas adsorbing activity of copper ion-exchanged ZSM-5 type zeolite is impaired as little as possible. For example, a mention is made of a method in which the copper ion-exchanged ZSM-5 type zeolite compact 21 is molded in a glove box in an inert atmosphere (realized by, for example, filling a glove box with an inert gas such as an argon (Ar) gas).

Thus, in the insulator 10A according to this embodiment, the copper ion-exchanged ZSM-5 type zeolite compact 21 as the gas adsorbent 20A is molded with a density higher than the density of the core material 11, and can adsorb a large volume of gas at normal temperature and a low partial pressure. Therefore, air components that cannot be eliminated by a vacuum pump etc., and moisture and air sticking to the core material 11 or the sheath material 12 can be satisfactorily adsorbed and removed. Accordingly, the pressure in the sheath material 12 (in the vacuum insulation structure) of the insulator 10A can be further reduced. Air or moisture that penetrates through the sheath material 12 with time can be adsorbed and removed to a high degree. Accordingly, the insulator 10A excellent in insulation performance and excellent in durability with time (retainability of insulation performance with time) can be provided.

The copper ion-exchanged ZSM-5 type zeolite compact 21 is an inorganic porous material having a relatively high gas phase ratio even though it is molded with a density higher than the density of the core material 11. Therefore, even if in production of the insulator 10A, for example, ambient air is adsorbed in the process for production of the insulator 10A, gas components such as air contained in the gas phase of the sheath material 12 can be removed by evacuation in the step of decompressing the inside of the sheath material 12. Accordingly, the heat conductivity of the copper ion-exchanged ZSM-5 type zeolite compact 21 itself is also reduced. Therefore, for example, as compared to an alloy-based gas adsorbent (see, for example, Patent Literature 1), a marked increase in heat conductivity of the insulator 10A can be effectively suppressed to improve the insulation performance of the insulator 10A.

(Embodiment 2)

In an insulator 10A according to embodiment 1, a gas adsorbent 20A is composed of a copper ion-exchanged ZSM-5 type zeolite compact 21, but the present invention is not limited thereto, and other gas adsorbent (sub-gas adsorbent) which does not contain copper ion-exchanged ZSM-5 type zeolite can be used in combination. In embodiment 2, an insulator with the copper ion-exchanged ZSM-5 type zeolite compact 21 and a sub-gas adsorbent used in combination as a gas adsorbent will be described in detail with reference to FIGS. 3A, 3B, 4 and 5.

Figure 3A:
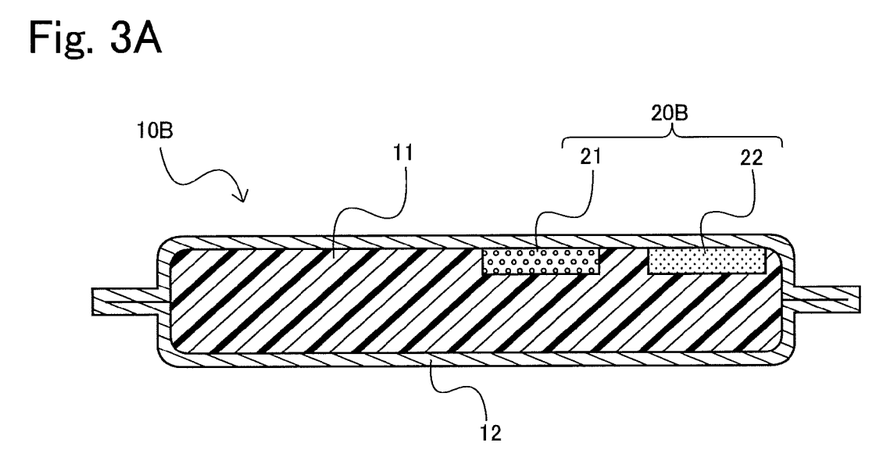
FIG. 3A is a schematic sectional view showing an outlined configuration of an insulator according to embodiment 2 of the present invention.

As shown in FIG. 3A, an insulator 10B according to embodiment 2 has a configuration basically similar to that of the insulator 10A described in embodiment 1, but in the insulator 10B, a moisture adsorbent 22 as a sub-gas adsorbent is used in combination with the copper ion-exchanged ZSM-5 type zeolite compact 21 as a gas adsorbent 20B. Namely, the insulator 10B according to this embodiment has a configuration in which the copper ion-exchanged ZSM-5 type zeolite compact 21 molded with a density higher than the density of the core material 11 and the moisture adsorbent 22 as a sub-gas adsorbent are covered with a sheath material 12, which has a gas barrier ability, to be decompressed and closed.

The specific configuration of the moisture adsorbent 22 is not particularly limited, and a known adsorbent capable of adsorbing and removing moisture or water vapor can be suitably used. Specific examples may include, but are not particularly limited to, oxides of alkali metals, oxides of alkali earth metals, hydroxides of alkali metals and hydroxides of alkali earth metals. A compound of a metal element of the group 1 in the periodic table or a metal element of the group 2 in the periodic table, such as an alkali metal or an alkali earth metal can chemically adsorb and immobilize moisture. Therefore, such a compound is preferable because it can satisfactorily immobilize moisture as compared to physical adsorption.

It is only necessary that the sub-gas adsorbent does not contain copper ion-exchanged ZSM-5 type zeolite, and is capable of adsorbing at least one of moisture and oxygen. Therefore, the sub-gas adsorbent is not limited to the moisture adsorbent 22, and an oxygen adsorbent that adsorbs oxygen, or an adsorbent that adsorbs both moisture and oxygen, or the like can also be suitably used. The specific configuration of the adsorbent capable of adsorbing oxygen is not particularly limited, and a known adsorbent can be suitably used. Specific examples include, but are not limited to, oxygen scavengers that adsorb oxygen by means of oxidation of iron.

Thus, in the insulator 10B according to this embodiment, the copper ion-exchanged ZSM-5 type zeolite compact 21 excellent in capability of adsorbing nitrogen and a sub-gas adsorbent (e.g. moisture adsorbent 22) excellent in capability of adsorbing moisture or oxygen or both are used in combination. Copper ion-exchanged ZSM-5 type zeolite has an excellent adsorbing capability for nitrogen and oxygen as main air components, moisture or the like, and can particularly satisfactorily adsorb nitrogen for which general gas adsorbents do not have a sufficient adsorption capability. On the other hand, even general gas adsorbents have a satisfactory adsorption capability for oxygen or moisture. Copper ion-exchanged ZSM-5 type zeolite is relatively expensive, and when an adsorbent which is more inexpensive than the zeolite is selected and used as a sub-gas adsorbent, production costs of the insulator 10B can be reduced.

Figure 3B:
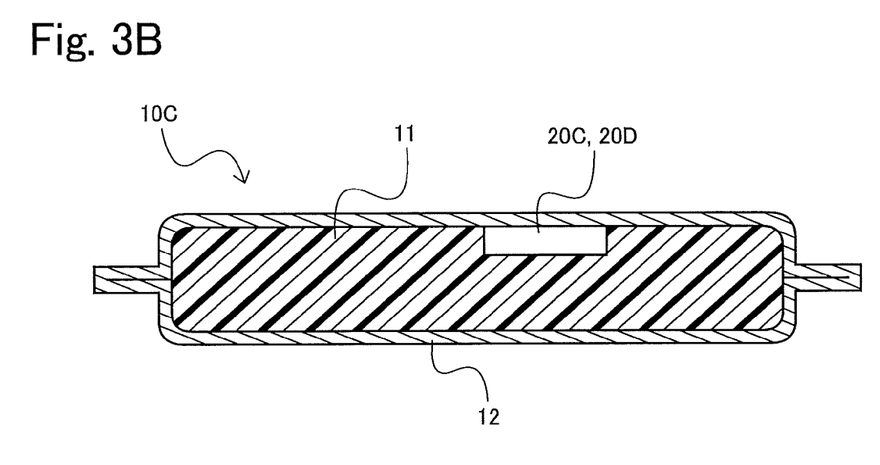
FIG. 3B is a schematic sectional view showing another configuration of the insulator shown in FIG. 3A.

In this embodiment, like the insulator 10B shown in FIG. 3A, the copper ion-exchanged ZSM-5 type zeolite compact 21 and the sub-gas adsorbent may be enclosed in the sheath material 12 as mutually independent members, or like an insulator 10C shown in FIG. 3B, the copper ion-exchanged ZSM-5 type zeolite compact 21 and the sub-gas adsorbent may be formed as a combined gas adsorbent 20C or 20D. In this configuration, an increase in the number of members that form the insulator 10C can be avoided.

Here, the combined gas adsorbent 20C or 20D shown in FIG. 3B is preferably one in which the surface of at least a part of the copper ion-exchanged ZSM-5 type zeolite compact 21 is covered with the sub-gas adsorbent.

Figure 4:
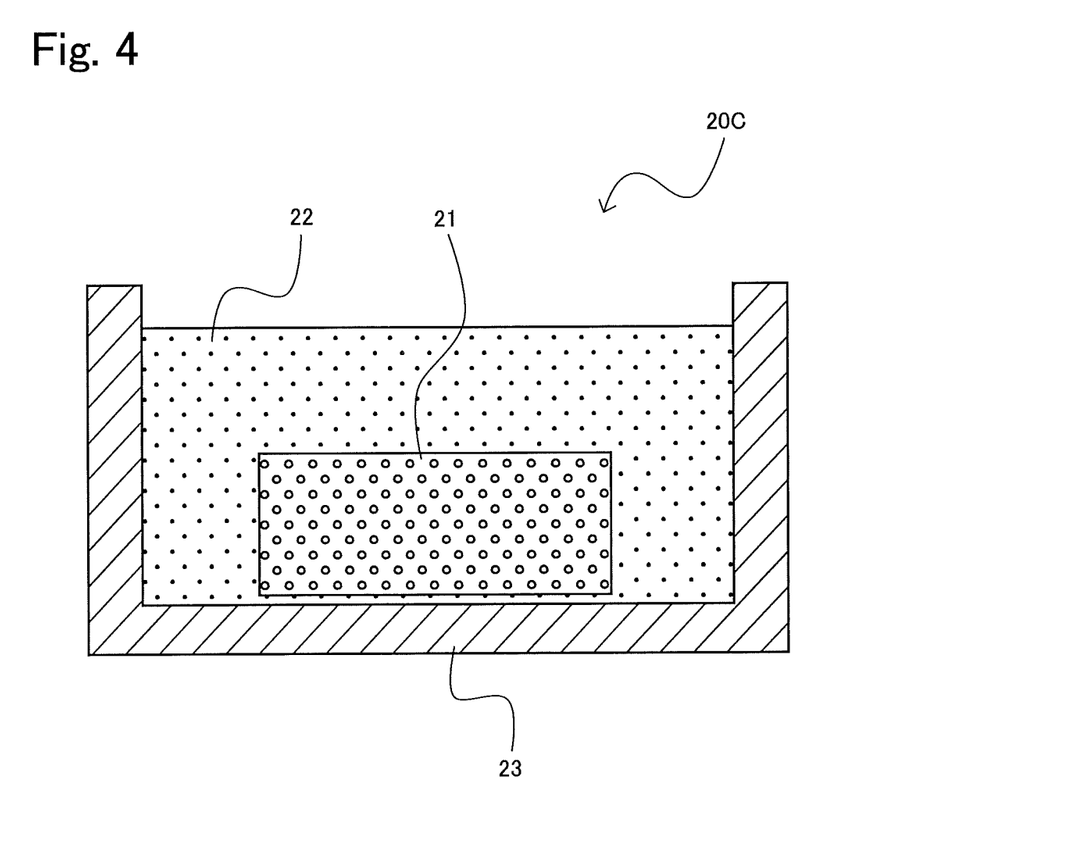
FIG. 4 is a schematic sectional view showing one example of the specific configuration of a gas adsorbent that is used in the insulator shown in FIG. 3B.
Figure 5:
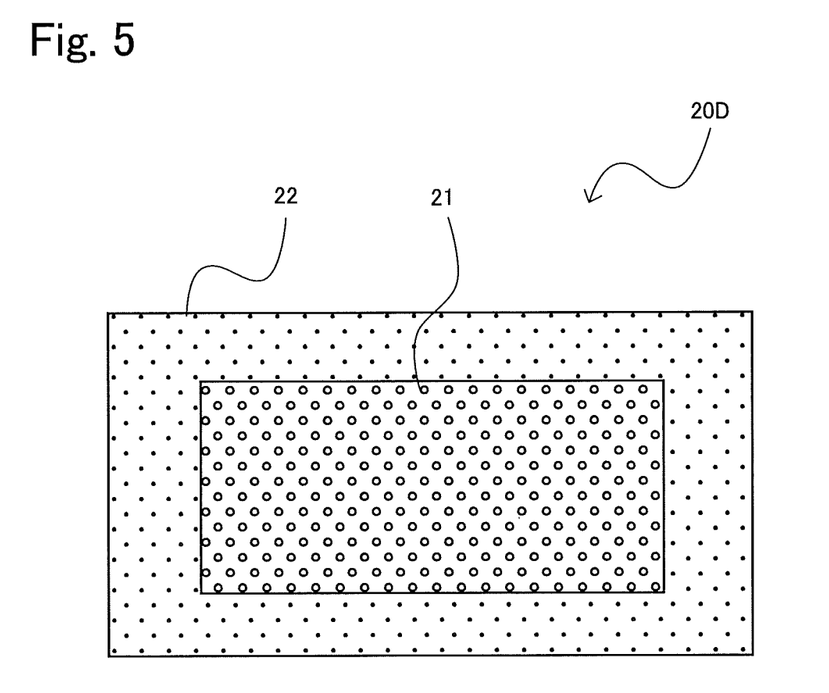
FIG. 5 is a schematic sectional view showing another example of the specific configuration of a gas adsorbent that is used in the insulator shown in FIG. 3B.

Specifically, for example, mention is made of the gas adsorbent 20C in which the copper ion-exchanged ZSM-5 type zeolite compact 21 is placed on the bottom of an adsorbent container 23 opened upward, and the moisture adsorbent 22 as a sub-gas adsorbent is put thereon as shown in FIG. 4. In this configuration, the surface of the copper ion-exchanged ZSM-5 type zeolite compact 21 excluding the lower surface thereof is covered with the sub-gas adsorbent. Mention is made of the gas adsorbent 20D of two-layer structure in which all the surface of the copper ion-exchanged ZSM-5 type zeolite compact 21 is covered with the moisture adsorbent 22 as a sub-gas adsorbent as shown in FIG. 5.

When the insulator 10C includes the above-mentioned gas adsorbent 20C or 20D, among gases to be adsorbed and removed, oxygen or moisture can be preferentially adsorbed and removed by the sub-gas adsorbent made to cover the surface, and nitrogen (and oxygen and moisture that cannot be removed) can be adsorbed and removed by copper ion-exchanged ZSM-5 type zeolite. Accordingly, the role of adsorption and removal by a plurality of types of gas adsorbents can be satisfactorily shared. As a result, the internal pressure of the insulator 10C can be further effectively reduced, so that the insulator 10C having further satisfactory insulation performance can be obtained.

When a sub-gas adsorbent is used in combination with copper ion-exchanged ZSM-5 type zeolite as a gas adsorbent, among nitrogen, oxygen and moisture that likely exist in the insulator 10B or 10C, particularly nitrogen can be adsorbed and removed by copper ion-exchanged ZSM-5 type zeolite, oxygen or moisture (or both) can be adsorbed and removed by the sub-gas adsorbent, and oxygen or moisture can be adsorbed and removed not only by the sub-gas adsorbent but also by copper ion-exchanged ZSM-5 type zeolite. Accordingly, the internal pressure of the insulator 10B or 10C can be further effectively reduced, so that the insulator 10B or 10C having further satisfactory insulation performance can be obtained.

The insulator 10C according to this embodiment includes the gas adsorbent 20C or 20D with copper ion-exchanged ZSM-5 type zeolite and a sub-gas adsorbent combined with each other, but this embodiment is not limited thereto, and an independent sub-gas adsorbent (e.g. moisture adsorbent 22) as shown in FIG. 3A may be used in combination with the combined gas adsorbent 20C or 20D. The copper ion-exchanged ZSM-5 type zeolite compact 21 shown in FIG. 1 or FIG. 3A may be used in combination with the combined gas adsorbent 20C or 20D. Further, an absorbent that satisfactorily adsorbs other gas components, other than the moisture adsorbent and the oxygen adsorbent, may be used in combination.

EXAMPLES

The present invention will be described more in detail on the basis of examples and comparative examples, but the present invention is not limited thereto. Various changes, modifications and alterations can be made by a person skilled in the art without departing from the scope of the present invention. Various measurements and evaluations in examples and comparative examples below were made as shown below.

(Measurement of Heat Conductivity of Insulator)

The heat conductivity of an insulator including a gas adsorbent was measured using a heat conductivity measuring apparatus (manufactured by EKO Instruments Co., Ltd.; trade name: AUTO Λ HC-074). At this time, the position of an insulating material was adjusted so that the portion where the gas adsorbent was placed was situated at the center.

(Evaluation of Insulation Performance of Insulator with Time)

An insulator including a gas adsorbent was stored in a thermostatic oven at 80° C. to perform a treatment for accelerating the speed at which air penetrated through a sheath material. After the insulator was stored for a time equivalent to a predetermined period of time derived by acceleration of penetration of air, the heat conductivity of the insulator was measured. Insulation performance was evaluated as being "○" when the heat conductivity was deteriorated as compared to that before storage, and insulation performance was evaluated as being "×" when the heat conductivity was deteriorated as compared to that before storage.

(Evaluation of Handling Characteristics of Gas Adsorbent During Production of Insulator)

The handling characteristics of the gas adsorbent was evaluated during production of the insulator. Handling characteristics were evaluated as being "○" when the gas adsorbent was enclosed in the sheath material without problems, handling characteristics were evaluated as being "Δ" when there was somewhat inconvenience at the time of enclosing the gas adsorbent in the sheath material, but there was practically no problem, and handling characteristics were evaluated as being "×" when there was a problem from a practical point of view at the time of enclosing the gas adsorbent in the sheath material.

Example 1

A compact of glass wool was used as a core material, and a rectangular laminate film with a nylon film, an aluminum foil and a polyethylene film laminated in this order was used as a sheath material. In this laminate film, the nylon film corresponds to a surface protecting layer, the aluminum foil corresponds to a gas barrier layer, and the polyethylene film corresponds to a heat-welding layer. A copper ion-exchanged ZSM-5 type zeolite compact formed by pressure-molding 0.5 g of a copper ion-exchanged ZSM-5 type zeolite powder with a molding density of 0.48 g/cm$^3$ as shown in Table 1 was used as a gas adsorbent. The nitrogen adsorption capacity of copper ion-exchanged ZSM-5 type zeolite used is 14 cm$^3$/g at normal temperature and normal pressure.

First, the two laminate films were superimposed on each other, heat-welded at three sides, and left as an opening at the remaining one side to prepare a bag-shaped sheath material. The glass wool (core material) and the copper ion-exchanged ZSM-5 type zeolite compact as a gas adsorbent were inserted from the opening of the sheath material. At this time, the copper ion-exchanged ZSM-5 type zeolite compact was disposed at the central part of the upper surface of the glass wool in a superimposed manner.

Thereafter, the sheath material with the glass wool and the copper ion-exchanged ZSM-5 type zeolite compact inserted therein was placed in a chamber connected to a vacuum pump, and the vacuum pump was operated to decompress the inside of the chamber. When the pressure in the chamber reached about 10 Pa, the opening of the sheath material was sealed by heat welding. In this way, an insulator of Example 1 was produced. At this time, the density of the glass wool sealed in the insulator was 240 kg/m$^3$ (0.24 g/cm$^3$).

For the obtained insulator, the heat conductivity was measured, and evaluation of insulation performance with time was performed as described above. The results thereof are shown in Table 1.

Example 2

An insulator of Example 2 was produced in the same manner as in Example 1 except that as a copper ion-exchanged ZSM-5 type zeolite compact, one formed by pressure-molding a copper ion-exchanged ZSM-5 type zeolite powder with a molding density of 0.91 g/cm³ as shown in Table 1 was used. For the obtained insulator, the heat conductivity was measured, and evaluation of insulation performance with time was performed as described above. The results thereof are shown in Table 1.

Example 3

An insulator of Example 3 was produced in the same manner as in Example 1 except that as a copper ion-exchanged ZSM-5 type zeolite compact, one formed by pressure-molding a copper ion-exchanged ZSM-5 type zeolite powder with a molding density of 1.22 g/cm³ as shown in Table 1 was used. For the obtained insulator, the heat conductivity was measured, and evaluation of insulation performance with time was performed as described above. The results thereof are shown in Table 1.

Example 4

An insulator of Example 4 was produced in the same manner as in Example 1 except that as a copper ion-exchanged ZSM-5 type zeolite compact, one formed by pressure-molding a copper ion-exchanged ZSM-5 type zeolite powder with a molding density of 1.40 g/cm³ as shown in Table 1 was used. For the obtained insulator, the heat conductivity was measured, and evaluation of insulation performance with time was performed as described above. The results thereof are shown in Table 1.

Example 5

An insulator of Example 5 was produced in the same manner as in Example 1 except that as a copper ion-exchanged ZSM-5 type zeolite compact, one formed by pressure-molding a copper ion-exchanged ZSM-5 type zeolite powder with a molding density of 1.51 g/cm³ as shown in Table 1 was used. For the obtained insulator, the heat conductivity was measured, and evaluation of insulation performance with time was performed as described above. The results thereof are shown in Table 1.

TABLE 1

|  | Molding density of gas adsorbent [unit: g/cm³] | Heat conductivity of insulator [unit: W/mK] | Evaluation with time | Evaluation of handling characteristics |
|---|---|---|---|---|
| Example 1 | 0.48 | 0.0030 | ○ | Δ |
| Example 2 | 0.91 | 0.0031 | ○ | ○ |
| Example 3 | 1.22 | 0.0031 | ○ | ○ |
| Example 4 | 1.40 | 0.0032 | ○ | ○ |
| Example 5 | 1.51 | 0.0033 | ○ | ○ |

Example 6

An insulator of Example 6 was produced in the same manner as in Example 1 except that as a gas adsorbent, one in which the periphery of 0.5 g of a copper ion-exchanged ZSM-5 type zeolite compact having a molding density of 1.20 g/cm³ was covered with 0.5 g of calcium oxide as a moisture adsorbent (see FIG. 5) was used. For the obtained insulator, the heat conductivity was measured, and evaluation of insulation performance with time and evaluation of the handling characteristics of the gas adsorbent were performed as described above. The results thereof are shown in Table 2.

Comparative Example 1

An insulator of Comparative Example 1 was produced in the same manner as in Example 1 except that as a gas adsorbent, only a moisture adsorbent formed of calcium oxide was used. For the obtained insulator, the heat conductivity was measured, and evaluation of insulation performance with time and evaluation of the handling characteristics of the gas adsorbent were performed as described above. The results thereof are shown in Table 2.

Comparative Example 2

An insulator of Comparative Example 2 was produced in the same manner as in Example 1 except that as a copper ion-exchanged ZSM-5 type zeolite compact, one formed by pressure-molding a copper ion-exchanged ZSM-5 type zeolite powder with a low molding density of 0.22 g/cm³ was used. Since the density of the glass wool was 0.24 g/cm³, the copper ion-exchanged ZSM-5 type zeolite compact of Comparative Example 2 has a density lower than the density of the core material. For the obtained insulator, the heat conductivity was measured, and evaluation of insulation performance with time and evaluation of the handling characteristics of the gas adsorbent were performed as described above. The results thereof are shown in Table 2.

Comparative Example 3

An insulator of Comparative Example 3 was produced in the same manner as in Example 1 except that as a gas adsorbent, a vacuum maintaining device formed of a Ba—Li alloy and a drying material as disclosed in Patent Literature 1 was used. For the obtained insulator, the heat conductivity was measured, and evaluation of insulation performance with time and evaluation of the handling characteristics of the gas adsorbent were performed as described above. The results thereof are shown in Table 2.

TABLE 2

|  | Gas adsorbent | Heat conductivity of insulator [unit: W/mK] | Evaluation with time | Evaluation of handling characteristics |
|---|---|---|---|---|
| Example 6 | Zeolite compact covered with calcium oxide | 0.0032 | ○ | ○ |
| Comparative Example 1 | Calcium oxide | 0.0050 | X | ○ |
| Comparative Example 2 | Low-density zeolite compact (0.22 g/cm³) | 0.0030 | ○ | X |
| Comparative Example 3 | Ba-Li alloy | 0.0060 | ○ | ○ |

*Zeolite compact: copper ion-exchanged ZSM-5 type zeolite compact

Comparison of Results of Examples and Comparative Examples

As is evident from comparison between the heat conductivity of the insulators of Examples 1 to 6 and the heat conductivity of the insulators of Comparative Examples 1 and 3, the insulator according to the present invention has a heat conductivity lower than that of an insulator including a conventional gas adsorbent, and thus can exhibit satisfactory insulation performance. This may be because air components that cannot be eliminated by a vacuum pump, moisture and air sticking to the core material or the sheath material, and the like can be adsorbed and removed by the copper ion-exchanged ZSM-5 type zeolite compact used as a gas adsorbent, and as a result, the pressure in the insulator can be satisfactorily reduced.

It is considered that since copper ion-exchanged ZSM-5 type zeolite is a porous material, air contained in voids of the copper ion-exchanged ZSM-5 type zeolite compact is relatively easily removed by evacuation by a vacuum pump. It is considered that accordingly, the heat conductivity of the copper ion-exchanged ZSM-5 type zeolite compact is also reduced, and therefore the insulators of Examples 1 to 6 can exhibit higher insulation performance as compared to the insulator of Comparative Example 3 which includes an alloy-based gas adsorbent.

Here, in the insulator of Example 1, satisfactory results are obtained for the heat conductivity and evaluation with time, but handling characteristics are evaluated as being "Δ" as shown in Table 1. This is because when the copper ion-exchanged ZSM-5 type zeolite compact was inserted into the sheath material, slight chipping occurred in a part of the compact although there was practically no problem. The copper ion-exchanged ZSM-5 type zeolite compact used in Example 1 has a molding density higher than the density of the core material (density of enclosed glass wool), but its molding density is the lowest among Examples 1 to 6, and this may be the reason why chipping occurred in the compact.

On the other hand, in each of the insulators of Examples 2 to 5, satisfactory results are obtained for the heat conductivity, evaluation with time, and evaluation of handling characteristics. However, in the insulator of Example 5, the molding density of the copper ion-exchanged ZSM-5 type zeolite compact used is high, and therefore as compared to the compacts used in other examples, a load necessary during molding is relatively larger, resulting in poor easiness of molding.

Accordingly, it is apparent that in the insulator according to the present invention, the molding density of the copper ion-exchanged ZSM-5 type zeolite compact to be used as a gas adsorbent is preferably in a range of 0.9 g/cm$^3$ to 1.4 g/cm$^3$ in view of handling characteristics and easiness of production although it is only necessary that the molding density of the compact is at least higher than the density of the core material.

As for evaluation with time for the insulators of Examples 1 to 5 and Comparative Example 2, an increase in heat conductivity was not observed in these insulators even after elapse of a storage time equivalent to about 3 years. As for evaluation with time for the insulator of Example 6, an increase in heat conductivity was not observed in the insulator even after elapse of a storage time equivalent to about 5 years.

On the other hand, as for evaluation with time for the insulator of Comparative Example 1, the start of an increase in heat conductivity was observed in the insulator after elapse of a storage time equivalent to about 3 months. In the insulator of Comparative Example 3, satisfactory results are obtained for evaluation with time, but the heat conductivity increases before evaluation with time as described above.

Thus, it is apparent that in the insulators of Examples 1 to 6 and Comparative Example 2, a very small amount of air that penetrates with time through the sheath material can be satisfactorily adsorbed and removed by the gas adsorbent, and therefore the heat conductivity can be maintained over a long period of time. Particularly in the insulator of Example 6, the heat conductivity can be maintained over a longer period of time as compared to the insulators of Examples 1 to 5. This may be because as a gas adsorbent, the moisture adsorbent as a sub-gas adsorbent is used in combination with the copper ion-exchanged ZSM-5 type zeolite compact, and the copper ion-exchanged ZSM-5 type zeolite compact is covered with the moisture adsorbent.

It is considered that in the insulator of Example 6, moisture contained in air penetrating through the sheath material was preferentially adsorbed and removed by the moisture adsorbent covering the surface, and nitrogen and oxygen (and moisture that was not removed) were adsorbed and removed by copper ion-exchanged ZSM-5 type zeolite, so that it was able to maintain insulation performance over a long period of time.

On the other hand, in the insulator of Comparative Example 1, the maintenance period of the heat conductivity is shorter as compared to Examples 1 to 6 (and Comparative Example 2). This may be because since as a gas adsorbent, the copper ion-exchanged ZSM-5 type zeolite compact is not used, and only the moisture adsorbent is used, a very small amount of air penetrating with time through the sheath material cannot be sufficiently adsorbed and removed, and only moisture contained in air is removed.

Accordingly, it is apparent that in the insulator according to the present invention, insulation performance can be maintained over a long period of time by using a copper ion-exchanged ZSM-5 type zeolite compact as a gas adsorbent, and particularly when the insulator includes a sub-gas adsorbent used in combination with the copper ion-exchanged ZSM-5 type zeolite compact (and further, the surface of at least a part of the copper ion-exchanged ZSM-5 type zeolite compact is covered with the sub-gas adsorbent), insulation performance can be maintained over a longer period of time.

From the above description, many modifications and other embodiments of the present invention are apparent to a person skilled in the art. Therefore, the above description should be construed as being only illustrative, and is presented for teaching a person skilled in the art the best mode for carrying out the present invention. Details of the structures and/or features of the present invention can be substantially changed without departing from the spirit of the present invention.

INDUSTRIAL APPLICABILITY

According to the present invention, there can be provided an insulator excellent in insulation performance and excellent in durability with time, and the insulator can be suitably used in, for example, fields of thermal equipment such as refrigerators and jar pots and building materials such as house walls and floor materials, and various applications that require insulation.

REFERENCE SIGNS LIST 10A to 10C insulator
11 core material
12 sheath material
20A to 20D gas adsorbent
21 copper ion-exchanged ZSM-5 type zeolite compact
22 moisture adsorbent
23 adsorbent container
200 copper ion-exchanged ZSM-5 type zeolite powder

The invention claimed is:

1. An insulator comprising:
   a core material that retains a space;
   a sheath material that has a gas barrier ability and encloses the core material therein in a decompressed and closed state; and
   a gas adsorbent enclosed in the sheath material together with the core material, wherein
   the gas adsorbent is a copper ion-exchanged ZSM-5 type zeolite compact which contains ZSM-5 type zeolite subjected to copper ion exchange and which is molded in such a manner that the density of the zeolite is higher than the density of the core material decompressed and sealed in the sheath material.

2. The insulator according to claim 1, wherein
   the molding density of the ZSM-5 type zeolite in the gas adsorbent, which is subjected to copper ion exchange, is in a range of 0.9 to 1.4 g/cm$^3$.

3. The insulator according to claim 1, wherein
   a nitrogen adsorption capacity of the gas adsorbent is 10 cm$^3$/g or more at normal temperature and normal pressure.

4. The insulator according to claim 1, wherein
   the insulator includes as the gas adsorbent a sub-gas adsorbent that is used in combination with the copper ion-exchanged ZSM-5 type zeolite compact, and
   the sub-gas adsorbent does not contain the copper ion-exchanged ZSM-5 type zeolite and is capable of adsorbing at least one of moisture and oxygen.

5. The insulator according to claim 4, wherein
   in the gas adsorbent, the surface of at least a part of the copper ion-exchanged ZSM-5 type zeolite compact is covered with the sub-gas adsorbent.

* * * * *